United States Patent
Otsuki et al.

(10) Patent No.: US 9,310,785 B2
(45) Date of Patent: Apr. 12, 2016

(54) APPARATUS AND A METHOD FOR CONTROLLING POWER SUPPLY AND DEMAND

(71) Applicant: KABUSHIKI KAISHA TOSHIBA, Minato-ku (JP)

(72) Inventors: Tomoshi Otsuki, Kanagawa-ken (JP); Hisashi Hayashi, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 452 days.

(21) Appl. No.: 13/944,030

(22) Filed: Jul. 17, 2013

(65) Prior Publication Data
US 2014/0025213 A1    Jan. 23, 2014

(30) Foreign Application Priority Data
Jul. 23, 2012   (JP) ................................. 2012-162785

(51) Int. Cl.
*G05B 13/02*   (2006.01)
*H02J 3/00*    (2006.01)

(52) U.S. Cl.
CPC .................. *G05B 13/02* (2013.01); *H02J 3/005* (2013.01); *H02J 3/008* (2013.01); *H02J 2003/007* (2013.01); *Y02E 60/76* (2013.01); *Y04S 10/54* (2013.01); *Y04S 20/222* (2013.01); *Y04S 40/22* (2013.01); *Y04S 50/10* (2013.01)

(58) Field of Classification Search
CPC .......... G05B 13/02; H02J 3/008; H02J 3/005; H02J 2003/007; Y04S 20/222; Y04S 50/10; Y04S 40/22; Y04S 10/54; Y02E 60/76
See application file for complete search history.

(56) References Cited

U.S. PATENT DOCUMENTS

| 5,414,640 A * | 5/1995 | Seem ........................ | H02J 3/14 307/35 |
| 8,200,370 B2 * | 6/2012 | Paik .......................... | H02J 3/14 700/12 |

(Continued)

FOREIGN PATENT DOCUMENTS

| JP | 2002-176729 A | 6/2002 |
| JP | 2006-50834 A | 2/2006 |

(Continued)

OTHER PUBLICATIONS

Japanese Office Action issued Aug. 28, 2015 in Patent Application No. 2014-223385 (with English Translation).

*Primary Examiner* — Charles Kasenge
(74) *Attorney, Agent, or Firm* — Oblon, McClelland, Maier & Neustadt, L.L.P

(57) ABSTRACT

According to one embodiment, an apparatus sends a request to adjust a power consumption to a plurality of request targets, based on power supply and demand. A minimum adjustment time of each request target is stored. The minimum adjustment time is an interval between a time when a request target receives the request and a time when the request target starts to adjust the power consumption. If an estimation value of the power supply is different from an estimation value of the power demand at a first time to start to adjust, at least one request target is selected from the request targets by using the minimum adjustment time. The at least one request target is acceptable for the request at a second time as a predetermined time prior to the first time. A first adjustment amount to the at least one request target is calculated until the second time.

14 Claims, 14 Drawing Sheets

(56) References Cited

U.S. PATENT DOCUMENTS

| | | | | |
|---|---|---|---|---|
| 8,817,677 B2* | 8/2014 | Ukita | ............... | H04W 52/0277 370/310 |
| 8,930,033 B2* | 1/2015 | Yang | ............... | H02J 3/14 700/286 |
| 2011/0198922 A1* | 8/2011 | Dames | ............... | H02J 3/14 307/18 |
| 2011/0208369 A1* | 8/2011 | Yang | ............... | H02J 3/14 700/296 |
| 2011/0282505 A1* | 11/2011 | Tomita | ............... | H02J 3/14 700/291 |
| 2012/0065792 A1* | 3/2012 | Yonezawa | ............... | H02J 3/14 700/291 |
| 2012/0083939 A1* | 4/2012 | Rognli | ............... | H02J 3/14 700/297 |
| 2012/0147802 A1* | 6/2012 | Ukita | ............... | H04W 52/0277 370/311 |
| 2012/0326505 A1* | 12/2012 | Otsuki | ............... | H02J 3/28 307/31 |
| 2012/0330469 A1* | 12/2012 | Kinugasa | ............... | H02J 3/14 700/286 |

FOREIGN PATENT DOCUMENTS

| | | |
|---|---|---|
| JP | 2010-166636 | 7/2010 |
| JP | 2011-193577 A | 9/2011 |
| JP | 2012-60789 A | 3/2012 |

* cited by examiner

| CUSTOMER ID | CUSTOMER 1 | |
|---|---|---|
| DEVICE ID | DEVICE(1,1) | DEVICE(1,2) |
| DEVICE TYPE | AIR CONDITIONER | STORAGE BATTERY |
| RESERVE CAPACITY INFORMATION | | |
| UNIT PRICE PER RESPONSE | 50 | 250 |
| MINIMUM ADJUSTMENT TIME (h) | 1 | 3 |
| MAXIMUM ADJUSTMENT AMOUNT (kWh) | 300/ 300 | 400/ 400 |
| TOTAL ADJUSTMENT AMOUNT (kWh) | 1200 | 400 |
| TOTAL TIME (h) | 2 | 24 |

FIG. 3

| TIME SLOT | USED AMOUNT (kWh) |
|---|---|
| 7:00-8:00 | 307 |
| 8:00-9:00 | 303.97 |
| 9:00-10:00 | 267.83 |
| 10:00-11:00 | 296.75 |
| 11:00-12:00 | 292.78 |
| 12:00-13:00 | 274.27 |
| 13:00-14:00 | 279.56 |
| 14:00-15:00 | 266.58 |
| 15:00-16:00 | 267.36 |
| 16:00-17:00 | 281.26 |
| 17:00-18:00 | 297.82 |
| 18:00-19:00 | 274.3 |

FIG. 4

| CUSTOMER ID | CUSTOMER 1 | | CUSTOMER 2 | ... |
|---|---|---|---|---|
| DEVICE ID | DEVICE(1,1) | DEVICE(1,2) | DEVICE(2,1) | ... |
| DEVICE TYPE | AIR CONDITIONER | STORAGE BATTERY | HEAT STORAGE TANK | ... |
| RESERVE CAPACITY INFORMATION | | | | |
| UNIT PRICE PER RESPONSE | 50 | 250 | 20 | ... |
| MINIMUM ADJUSTMENT TIME (h) | 1 | 3 | 6 | ... |
| MAXIMUM ADJUSTMENT AMOUNT (kWh) | 300/300 | 400/400 | 100/100 | ... |
| TOTAL ADJUSTMENT AMOUNT (kWh) | 1200 | 400 | 100 | ... |
| TOTAL TIME (h) | 2 | 24 | 24 | ... |

FIG. 5

| CUSTOMER ID | CUSTOMER 1 | | CUSTOMER 2 | ... | TOTAL |
|---|---|---|---|---|---|
| DEVICE ID | DEVICE(1,1) | DEVICE(1,2) | DEVICE(2,1) | ... | - |
| DEVICE TYPE | AIR CONDITIONER | STORAGE BATTERY | HEAT STORAGE TANK | ... | - |
| | DR PLAN (kWh) | | | | |
| 7:00–8:00 | 0 | 0 | 0 | ... | 0 |
| 8:00–9:00 | 0 | 0 | 0 | ... | 0 |
| 9:000–10:00 | 0 | 0 | 0 | ... | 0 |
| 10:00–11:00 | 0 | 0 | 0 | ... | 0 |
| 11:00–12:00 | 0 | 200 | 0 | ... | 200 |
| 12:00–13:00 | 150 | 50 | 0 | ... | 200 |
| 13:00–14:00 | 150 | 50 | 0 | ... | 200 |
| 14:00–15:00 | 0 | 100 | 100 | ... | 200 |
| ... | ... | ... | ... | | ... |

FIG. 6

| CUSTOMER ID | CUSTOMER 1 | |
|---|---|---|
| DEVICE ID | DEVICE(1,1) | DEVICE(1,2) |
| DEVICE TYPE | AIR CONDITIONER | STORAGE BATTERY |
| MINIMUM ADJUSTMENT TIME (h) | 1 | 3 |
| TOTAL ADJUSTMENT AMOUNT (kWh) | 1200 | 400 |
| TOTAL TIME (h) | 2 | 24 |

| TIME SLOT | DEVICE(1,1) | | DEVICE(1,2) | |
|---|---|---|---|---|
| | MAXIMUM ADJUSTMENT AMOUNT | UNIT PRICE PER RESPONSE | MAXIMUM ADJUSTMENT AMOUNT | UNIT PRICE PER RESPONSE |
| 7:00–8:00 | 400/ 400 | 50 | 200/ 200 | 150 |
| 8:00–9:00 | 400/ 400 | 50 | 200/ 200 | 150 |
| 9:00–10:00 | 400/ 400 | 50 | 200/ 200 | 150 |
| 10:00–11:00 | 400/ 400 | 50 | 200/ 200 | 150 |
| 11:00–12:00 | 400/ 400 | 100 | 200/ 200 | 250 |
| 12:00–13:00 | 300/ 300 | 100 | 100/ 100 | 250 |
| 13:00–14:00 | 300/ 300 | 100 | 100/ 100 | 250 |
| 14:00–15:00 | 300/ 300 | 100 | 100/ 100 | 250 |
| 15:00–16:00 | 300/ 300 | 100 | 100/ 100 | 250 |
| 16:00–17:00 | 300/ 300 | 100 | 100/ 100 | 250 |
| 17:00–18:00 | 400/ 400 | 50 | 200/ 200 | 150 |
| 18:00–19:00 | 400/ 400 | 50 | 200/ 200 | 150 |

FIG. 10

| CUSTOMER ID | CUSTOMER 1 | |
|---|---|---|
| DEVICE ID | DEVICE(1,1) | DEVICE(1,2) |
| DEVICE TYPE | AIR CONDITIONER | STORAGE BATTERY |
| MINIMUM ADJUSTMENT TIME (h) | 1 | 3 |
| TOTAL ADJUSTMENT AMOUNT (kWh) | 1200 | 400 |
| TOTAL TIME (h) | 2 | 24 |

| | DEVICE(1,1) | | DEVICE(1,2) | |
|---|---|---|---|---|
| INTERVAL | MAXIMUM ADJUSTMENT AMOUNT | UNIT PRICE PER RESPONSE | MAXIMUM ADJUSTMENT AMOUNT | UNIT PRICE PER RESPONSE |
| 0(h)~1(h) | – | – | – | – |
| 1(h)~2(h) | 400/ 400 | 100 | – | – |
| 2(h)~3(h) | 400/ 400 | 100 | – | – |
| 3(h)~4(h) | 400/ 400 | 100 | 100/ 100 | 250 |
| 4(h)~5(h) | 400/ 400 | 100 | 100/ 100 | 250 |
| 5(h)~6(h) | 400/ 400 | 50 | 200/ 200 | 150 |
| 6(h)~7(h) | 400/ 400 | 50 | 200/ 200 | 150 |
| 7(h)~8(h) | 400/ 400 | 50 | 200/ 200 | 150 |
| 8(h)~9(h) | 400/ 400 | 50 | 200/ 200 | 150 |
| ... | ... | ... | ... | ... |

FIG. 11

| OPERATION CONDITION | SUMMER: IN CASE OF RAISING PRESET TEMPERATURE | | | WINTER: IN CASE OF LOWERING PRESET TEMPERATURE | | |
|---|---|---|---|---|---|---|
| | +1°C | +2°C | +3°C | −1°C | −2°C | −3°C |
| UNIT PRICE PER RESPONSE | 30 | 50 | 100 | 30 | 50 | 100 |
| | MAXIMUM ADJUSTMENT AMOUNT (kWh) | | | | | |
| 7:00–8:00 | 50 | 75 | 100 | 100 | 150 | 200 |
| 8:00–9:00 | 50 | 75 | 100 | 100 | 150 | 200 |
| 9:00–10:00 | 50 | 75 | 100 | 100 | 150 | 200 |
| 10:00–11:00 | 50 | 75 | 100 | 100 | 150 | 200 |
| 11:00–12:00 | 60 | 90 | 120 | 120 | 180 | 240 |
| 12:00–13:00 | 60 | 90 | 120 | 120 | 180 | 240 |
| 13:00–14:00 | 60 | 90 | 120 | 120 | 180 | 240 |
| 14:00–15:00 | 60 | 90 | 120 | 120 | 180 | 240 |
| 15:00–16:00 | 50 | 75 | 100 | 100 | 150 | 200 |
| 16:00–17:00 | 50 | 75 | 100 | 100 | 150 | 200 |
| 17:00–18:00 | 50 | 75 | 100 | 100 | 150 | 200 |
| 18:00–19:00 | 50 | 75 | 100 | 100 | 150 | 200 |

FIG. 12

| CUSTOMER ID | CUSTOMER 1 | |
|---|---|---|
| DEVICE ID | DEVICE(1,1) | DEVICE(1,2) |
| DEVICE TYPE | AIR CONDITIONER | STORAGE BATTERY |
| RESERVE CAPACITY INFORMATION | | |
| UNIT PRICE PER RESPONSE | 50 | 250 |
| MINIMUM ADJUSTMENT TIME (h) | 1 | 3 |
| MAXIMUM ADJUSTMENT AMOUNT (kWh) | 300/ −300 | 400/ −400 |
| TOTAL ADJUSTMENT AMOUNT (kWh) | 1200 | 400 |
| TOTAL TIME (h) | 2 | 24 |

FIG. 14

APPARATUS AND A METHOD FOR CONTROLLING POWER SUPPLY AND DEMAND

CROSS-REFERENCE TO RELATED APPLICATION

This application is based upon and claims the benefit of priority from Japanese Patent Application No. 2012-162785, filed on Jul. 23, 2012; the entire contents of which are incorporated herein by reference.

FIELD

Embodiments described herein relate generally to an apparatus and a method for controlling power supply and demand.

BACKGROUND

In case of operating a power system, a power supplier who generates or distributes power makes a request for power adjustment (reduction or increase) of a customer who utilizes the power. By this request, technique to control power demand-supply balance (as balance between a power demand amount and a power supply amount) in all the power system is proposed.

Based on the power demand amount and the power supply amount previously estimated, the power supplier requests the power adjustment of each customer. In response to this request, the customer performs the power adjustment. Accordingly, a time lag occurs between a time when the power supplier requests the power adjustment and a time when the customer starts the power adjustment.

If accuracy of control of power demand-supply balance is prioritized, the time lag had better be shortened. However, it often happens that a time when the power supplier requests the power adjustment of the customer is just before a time for the customer to start the power adjustment. In this case, the customer might not perform the power adjustment. Otherwise, burden of the customer is more increased.

BRIEF DESCRIPTION OF THE DRAWINGS

FIG. 3 is one example of device information according to the first embodiment.

FIG. 4 is one example of used amount according to the first embodiment.

FIG. 5 is one example of device information (all customers) according to the first embodiment.

FIG. 6 is one example of DR plan according to the first embodiment.

FIG. 10 is a first example of device information according to the second embodiment.

FIG. 11 is a second example of device information according to the second embodiment.

FIG. 12 is a third example of device information according to the second embodiment.

FIG. 14 is one example of device information according to the third embodiment.

DETAILED DESCRIPTION

According to one embodiment, an apparatus sends a request to adjust a power consumption to a plurality of request targets, based on power supply and demand. The apparatus includes a memory unit, a selection unit, and a first calculation unit. The memory unit is configured to store a minimum adjustment time of each request target. The minimum adjustment time is an interval between a time when a request target receives the request and a time when the request target starts to adjust the power consumption. The selection unit is configured to, if an estimation value of the power supply is different from an estimation value of the power demand at a first time to start to adjust the power consumption, select at least one request target from the request targets by using the minimum adjustment time. The at least one request target is acceptable for the request at a second time. The second time is a predetermined time prior to the first time. The first calculation unit is configured to calculate a first adjustment amount to the at least one request target until the second time.

Various embodiments will be described hereinafter with reference to the accompanying drawings.

The First Embodiment

Figure 1:
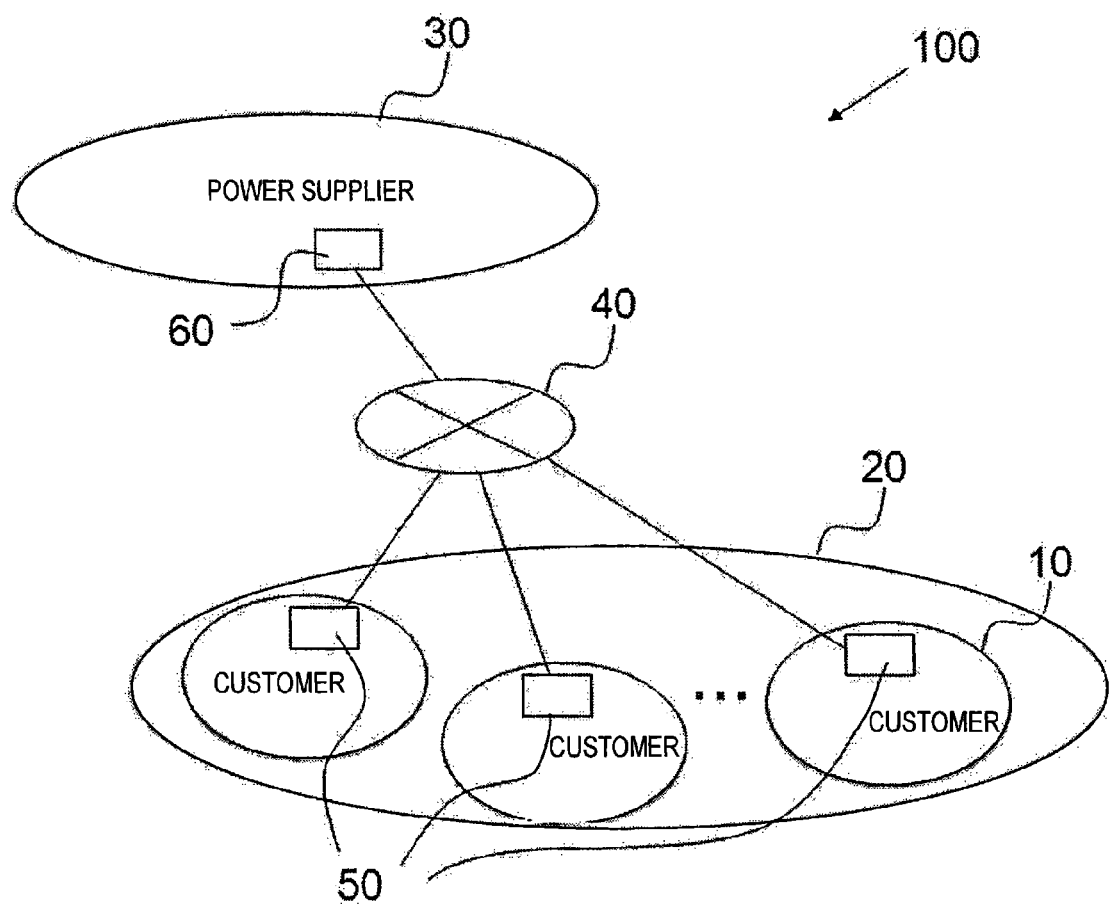
FIG. 1 is an outline drawing of a power control system.

FIG. 1 is an outline drawing of a power control system 100. The power control system 100 of FIG. 1 is separated into a group 20 comprising a plurality of customers 10 who utilize power and a power supplier 30 who supplies power to each customer 10 belonging to the group 20. A power management apparatus 50 equipped by the customer 10 and a power supply and demand-control apparatus equipped by the power supplier 30 are connected via a network 40 including internet network or power network. For example, each customer 10 equips one or a plurality of electric devices 11 (Hereinafter, they are called "device") such as an air conditioner, a lighting, or a computer that consumes power. The power supplier 30 supplies the power to the device 11 equipped by each customer 10.

The customer 10 may include, for example, ordinary homes and office buildings. Then, the group 20 may be a set of ordinary homes, a set of office buildings, or a set where they are mixed, may be. Furthermore, the power supplier 30 may be a trader who carries on business from power generation to supply, or a trader who carries on business of supply only. Furthermore, it may be a trader (called aggregator) who mediated between the power supplier and the customer.

The group 20 includes a plurality of request targets as a whole. This request target is the device 11 able to control (reduction or increase) a power (power demand) consumed as the group 20. Briefly, the device 11 is a target to be requested the power adjustment. Moreover, part of or all of the devices 11 equipped by each customer 10 may be one request target.

Figure 2:
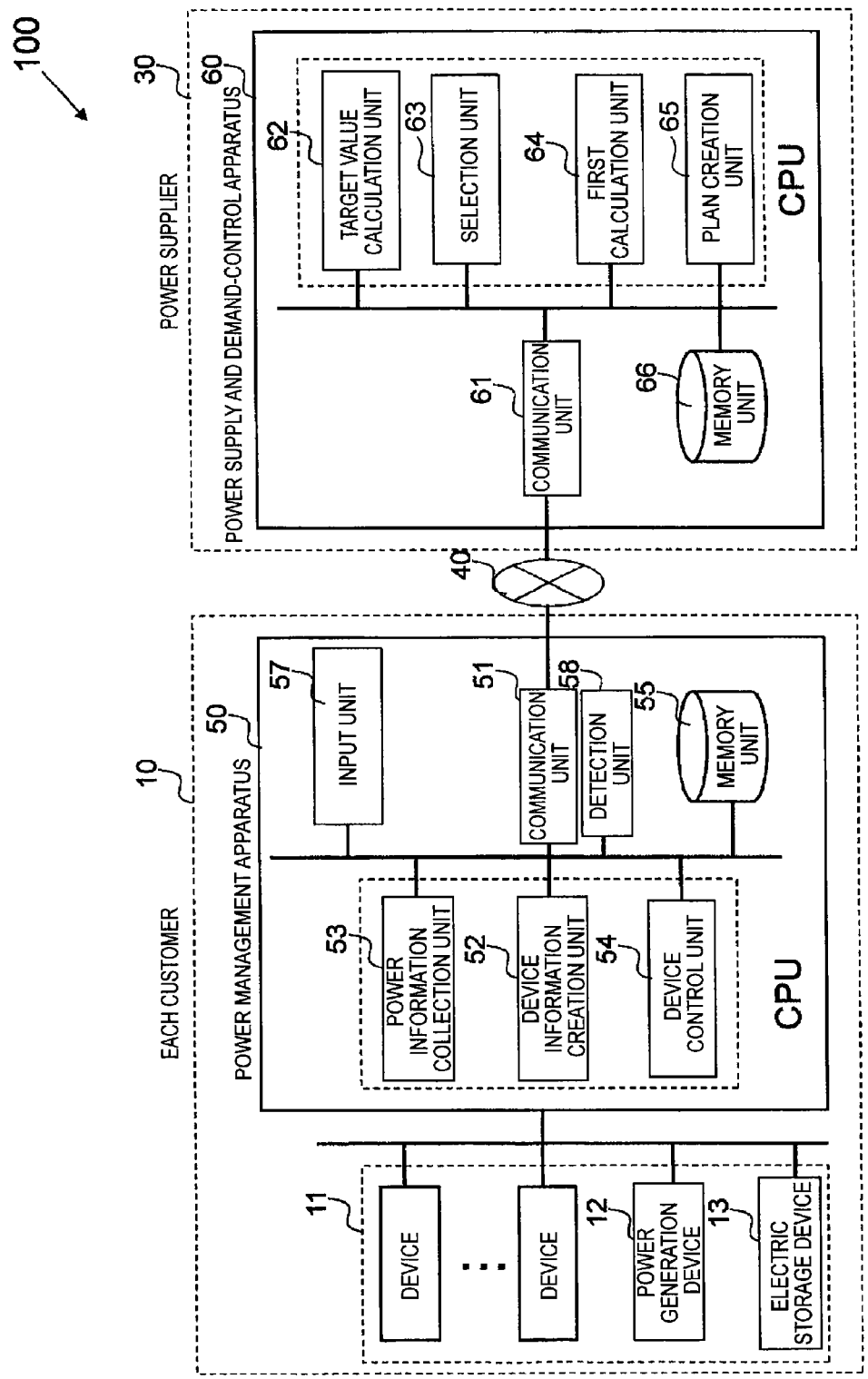
FIG. 2 is a block diagram of the power control system according to the first embodiment.

FIG. 2 is a block diagram of the power control system 100 according to the first embodiment. Hereinafter, an example that each device 11 equipped by each customer 10 is one request target will be explained. Briefly, hereinafter, the request target is simply called the device 11.

Each customer 10 equips a plurality of devices 11. While an operator belonging to each customer 10 is using these devices 11, the power is consumed. All or a part of devices 11 of the customer 10 may include a power generation device 12 such as a solar-power generation system, or an electric storage device 13 for discharge and charge. Moreover, above-mentioned power demand is regarded as a sum of power consumption of all request targets equipped in the group 20.

Each customer 10 equips the power management apparatus 50 to manage power in the customer. The device 11 equipped by each customer 10 is connected to the power management apparatus 50 wiredly or wirelessly. The power management apparatus 50 manages power consumption and device information (explained afterwards) of the device 11. Furthermore, the power management apparatus 50 can control operation of the device 11 instead of the operator.

The power supplier 30 equips the power supply and demand-control apparatus 60 to control power demand-supply balance in the power control system 100. Based on data sent from the power management apparatus 50 of each customer 10 via the network 40, the power supply and demand-control apparatus 60 creates DR plan to control power demand-supply balance as a whole. In this DR plan, for example, an adjustment amount (reduction amount or increase amount) of power consumption to each device 11 equipped by each customer 10 is included. The adjustment amount is, when the customer 10 uses the device 11, a power amount able to be controlled (reduced or increased) from a baseline power amount (Hereinafter, baseline value) consumed for each predetermined time (For example, time slot). Here, in case of requesting reduction, a reduction amount is the adjustment amount. In case of requesting increase, an increase amount is the adjustment amount. Briefly, in any case of the reduction amount and the increase amount, the adjustment amount is a positive value. Moreover, the baseline value may be, for example, a power consumption necessary at the minimum when the customer 10 uses the device 11, or an average of power consumption in the past without constraint condition (by request).

Furthermore, based on this DR plan, the power supply and demand-control apparatus 60 sends a demand response signal (DR signal) to the power management apparatus 50 of each customer 10. This DR signal indicates the adjustment amount. Furthermore, the DR signal may include a power generation amount as the adjustment amount indicated to the power generation device 12. Furthermore, the adjustment amount may include discharge and charge amount of the electric storage device 13.

In following explanation, one day is segmented to twenty four slots by one hour unit, and each segmented slot is called a time slot. Here, an interval of time slot is fixedly one hour. Furthermore, here, time slots from 7:00 to 19:00 are target of DR plan. Briefly, total twelve time slots from a time slot 7:00-8:00 to a time slot 18:00-19:00 are considered.

In the first embodiment, before time slots to be targeted DR plan (For example, 6:00), the power supply and demand-control apparatus 60 creates DR plan of one day (7:00-19:00). Then, before time slots to be targeted DR plan (For example, 7:00), the power supply and demand-control apparatus 60 sends DR signal to all customers 10 simultaneously.

(The Power Management Apparatus)

Hereinafter, component of the power management apparatus 50 will be explained in detail by referring to FIG. 2.

The power management apparatus 50 includes a communication unit 51 to send/receive data with the power supply and demand-control apparatus 60 via the network 40. Furthermore, the power management apparatus 50 includes a device information creation unit 52, a power information collection unit 53, a device control unit 54, and a memory unit 55. An operation processor such as CPU is used for the device information creation unit 52, the power information collection unit 53, and the device control unit 54. Furthermore, a memory device such as a memory or a magnetic disk is used for the memory unit 55.

The device information creation unit 52 creates device information of each of all devices 11 equipped by each customer 10, and stores the device information into the memory unit 55. As shown in FIG. 3, the device information includes a device ID to specify the device 11 (k-th device equipped by i-th customer: device (i,k)), a device type representing a type of the device 11, and reserve capacity information representing a capacity able to execute a request. The device ID may be obtained by the device information creation unit 52 from the device 11 at the timing when the device 11 is connected to the power management apparatus 50, in the order of connection thereof. Furthermore, the device type may be obtained by the device information creation unit 52 from the device 11 at the timing when the device 11 is connected to the power management apparatus 50.

The reserve capacity information includes "unit price per response" representing a cost when a power consumption of the device 11 is adjusted (regulated) by unit amount (e.g. 1 kWh). Briefly, by multiplying the unit price per response with the adjustment amount, the multiplication value represents a cost assigned to the customer 10 to adjust the power consumption of the device 11. This cost represents, for example, a price required by the customer 10 or an unpleasantness degree felt by the customer 10 as the power consumption is adjusted.

Furthermore, the reserve capacity information includes "minimum adjustment time" representing a minimum time from a receiving time of DR signal by the communication unit 51 to a start time of adjustment of the power consumption. This minimum adjustment time represents a minimum time necessary from timing when the communication unit 51 receives DR signal to timing when the device control unit 54 (explained afterwards) starts to control operation of the device 11. Briefly, by this minimum adjustment time, timing for the communication unit 51 to receive DR signal can be limited.

Furthermore, in case of necessity, the reserve capacity information may include "maximum adjustment amount" representing a maximum of an adjustment amount controllable (reduction or increase) from a baseline value. Here, the maximum adjustment amount includes a maximum of a reduction amount and a maximum of an increase amount. In FIG. 3, at an item of "maximum adjustment amount", "(maximum of reduction amount)/(maximum of increase amount)" is recorded.

Furthermore, in case of necessity, the reserve capacity information includes "total time" representing an upper limit of time able to execute a request in one day, and "total adjustment amount" representing an upper limit of the adjustment amount (absolute value) controllable in one day.

Moreover, for example, the reserve capacity information can be set for each device 11 by the customer 10 using an input unit 57 such as a touch panel, or can be previously set for each device 11 by the power supplier 30. The reserve capacity information can be periodically updated.

The power information collection unit 53 (For example, periodically at each time slot) detects a power consumption (used amount) of all devices 11 (equipped by each customer 10) by a detection unit 58 such as a power meter. As shown in FIG. 4, the used amount is stored as time series data in the memory unit 55. Here, by detecting the power consumption of each device 11, the power information collection unit 53 may totally detect the power consumption of all devices 11 as the sum.

In this case, if the customer 10 equips the power generation device 12, a power generation amount by the power generation device 12 is subtracted from the power consumption of all devices 11 excluding the power generation device 12, and the result value is set to the used amount. Furthermore, if the customer 10 equips the electric storage device 13, a discharge amount by the electric storage device 13 is subtracted from the power consumption of all devices 11 excluding the electric storage device 13, and the result value is set to the used amount. Moreover, while the electric storage device 13 is charging, the charge amount is regarded as the power consumption.

If the power information collection unit 53 cannot detect the used amount of the device 11, the power information collection unit 53 may estimate the used amount based on interpolation processing or past power data thereof. Furthermore, if a cycle for the power information collection unit 53 to detect the used amount of the device 11, and if the latest used amount is not obtained, in the same way as mentioned-above, the power information collection unit 53 may estimate the used amount until the present time based on interpolation processing or past power data thereof.

Based on DR signal accepted from the communication unit 51, the device control unit 54 controls operation of the device 11 so that the power consumption of the device 11 is nearer to a power after the adjustment amount is added to or reduced from the baseline value. Here, control of operation of the device 11 means controlling ON/OFF of the device 11 or switching of the operation condition (For example, in case of air conditioner, setting temperature thereof).

Briefly, when a reduction amount of the power consumption is indicated as the adjustment amount, the device control unit 54 controls operation of the device 11 so that the power consumption of the device 11 gets close to a power consumption which the adjustment amount is deleted from the baseline value. Furthermore, when an increase amount of the power consumption is indicated as the adjustment amount, the device control unit 54 controls operation of the device 11 so that the power consumption of the device 11 gests close to a power consumption which the adjustment amount is added to the baseline value.

The communication unit 51 obtains device information and the used amount from the memory unit 55, and sends the device information and the used amount to the communication unit 61 of the power supply and demand-control apparatus 60 via the network 40 at intervals (e.g. periodically) or in real time. Furthermore, the communication unit 51 receives DR signal from the communication unit 61 of the power supply and demand-control apparatus 60.

(The Power Supply and Demand-Control Apparatus)

Hereinafter, component of the power supply and demand-control apparatus 60 will be explained in detail by referring to FIG. 2.

The power supply and demand-control apparatus 60 includes the communication unit 61 to send/receive data with the power management apparatus 50 via the network 40. Furthermore, the power supply and demand-control apparatus 60 includes a target value calculation unit 62, a selection unit 63, a first calculation unit 64, a plan creation unit 65, and a memory unit 66. An operation processor such as CPU is used for the target value calculation unit 62, the selection unit 63, the first calculation unit 64, and the plan creation unit 65. Furthermore, a storage device such as a memory or a magnetic disk is used for the memory unit 66.

The target value calculation unit 62 calculates a demand-supply unbalance as a gap value between an estimation value of a power supply (obtained from power supply plan) and an estimation value of a power demand (obtained from used amount of all customers stored in the memory unit 66). The target value calculation unit 62 calculates a power amount (target value) of each time slot necessary to resolve the demand-supply unbalance. For example, the target value calculation unit 62 calculates the target value at timing when a supply plan is registered.

Here, the supply plan is an estimation value of the power planed (estimated) to supply from the power supplier 30 to the devices 11 (included in the group 20) for each time slot. Here, the supply plan may be registered as a predetermined value for each time slot. Also, this supply plan may be registered as one day plan from the present time, before a time slot to be targeted DR plan (For example, 5:00).

Furthermore, the demand-supply unbalance is a value obtained by subtracting an estimation value of the power supply (shown in the supply plan) from an estimation value of the power demand planed to be totally consumed by the group 20. If the demand-supply unbalance is a positive value (plus), it represents demand-excess. If the demand-supply unbalance is a negative value (minus), it represents supply-excess.

If the demand-supply unbalance is plus, the target value calculation unit 62 calculates a target value of a reduction amount. If the demand-supply unbalance is minus, the target value calculation unit 62 calculates a target value of an increase amount. Specifically, the target value of the reduction amount and the increase amount may be calculated as, for example, an absolute value of the demand-supply unbalance.

Moreover, an estimation value of the power demand can be calculated, for example, by referring to past power data of the used amount of each customer 100 (stored in the memory unit 66). For example, the estimation value may be calculated as an average of data in several past years, at the same day and the same time as a time slot of target of DR plan. Furthermore, based on weather condition such as a temperature predicted at a time slot to be targeted DR plan, the estimation value may be calculated as an average of data at the past date having the same or similar weather condition.

Furthermore, the target value is not limited to above-mentioned example. For example, the target value may be calculated based on an estimation model of the power demand estimated from tendency of past weather condition. Furthermore, the target value may be given by a power company or an upper energy management system.

If there is a gap between an estimation value of the power supply and an estimation value of the power demand for each time slot, the selection unit 63 selects a device 11 as a request target by using the minimum adjustment time included in the device information of all customers 10. Briefly, the selection unit 63 selects the device 11 able to be requested until the minimum adjustment time earlier than a start time of time slot of request target. Specifically, as for a minimum adjustment time is smaller than (or equal to) an interval between a time t0 to send DR signal and a time t1 of a time slot to be targeted, a device 11 having this minimum adjustment time is selected as a request target.

Here, assume that device information of all customers 10 is given as shown in FIG. 5, and time t0 to send DR signal is 7:00. Moreover, assume that a time slot to be targeted is 12:00-13:00. In this case, a start time 12:00 of the time slot (12:00-13:00) is set to time t1. Furthermore, an interval from times t0 and t1 is five hours.

Accordingly, among a minimum adjustment time (one hour) of device (1,1), a minimum adjustment time (three hours) of device (1,2), and a minimum adjustment time (six hours) of device (2, 1), devices of which minimum adjustment time is smaller than (or equal to) five hours are the device (1,1) and device (1,2) only. Accordingly, in this example, the selection unit 63 can select the device (1,1) and device (1,2) as the request target. Here, for example, in ascending order of device ID (j,k) of the device 11, a device ID (k) of request target is assigned. Briefly, hereinafter, a request target to which the device ID (k) is assigned is called a request target k.

By using the device information, the first calculation unit 64 calculates an adjustment amount to each request target for each time slot so that a sum of adjustment amounts to all request targets is close to the target value. For example, at timing when the target value calculation unit 62 calculates the target value, the first calculation unit 64 calculates the adjustment amount.

For example, the first calculation unit 64 solves an optimization problem (following equation) of which decision variables are adjustment amounts of the power consumption to each request target. As a method to solve this optimization problem, an optimum solver such as ilog CPLEX as a solver to strictly search an optimum solution, a simulated annealing or a heuristic method as tabu search as a method to search a local optimum solution, can be used.

$$\min \Sigma_{t \in T} \Sigma_{k \in K} \{v_t^k \cdot C^k\} \quad (1)$$

$$s.t. \Sigma_{k \in K} v_t^k - |E_t| \geq 0 \, \forall t \in T \quad (2)$$

$$0 \leq v_t^k \leq A^k \cdot x_t^k \forall k \in K, \forall t \in T \quad (3)$$

$$\Sigma_{t \in T} L_t \cdot x_t^k \leq M_k \forall k \in K \quad (4)$$

$$\Sigma_{t \in T} v_t^k \leq N^k \forall k \in K \quad (5)$$

Here, in equations (1)~(5), parameters are defined as follows.

$x_t^k$: variable representing request or non-request for request target k at time slot t (In case of request, $x_t^k=1$. In case of non-request, $x_t^k=0$)

$v_t^k$ adjustment amount to request target k at time slot t (In case of $E_t > 0$, reduction amount. In case of $E_t < 0$, increase amount)

K={1, 2, . . . , |K|}: set of request target
T={1, 2, . . . , |T|}: set of time slot
$|E_t|$: target value at time slot t
$E_t$: demand-supply unbalance at time slot t (In case of demand-excess, $E_t > 0$. In case of supply-excess, $E_t < 0$)
$L_t$: interval at time slot t
$A^k$: maximum adjustment amount of request target k (In case of $E_t > 0$, maximum of reduction amount. In case of $E_t < 0$, maximum of increase amount)
$C^k$: unit price per response of request target k
$M^k$: total time of request target k
$N^k$ total adjustment amount of request target k Briefly, in this example, the first calculation unit 64 calculates the adjustment amount to each request target so that a sum of costs for adjustment of the power consumption (shown in equation (1) under condition of equations (2)~(5)) is minimized.

The equation (2) represents that a sum of adjustment amounts to each request target is larger than (or equal to) the target value. The equation (3) represents that adjustment amounts to each request target is smaller than (or equal to) the maximum adjustment amount. The equation (4) represents that the sum of time slots to each request target is smaller than (or equal to) the total time. The equation (5) represents that the sum of adjustment amounts to each request target is smaller than (or equal to) the total adjustment amount.

The plan creation unit 65 creates a DR plan for request targets by using the adjustment amount to each request target (calculated by the first calculation unit 64). The plan creation unit 65 stores the DR plan into the memory unit 66.

The communication unit 61 obtains the DR plan from the memory unit 66, and sends DR signal based on the DR plan to the communication unit 51 of the power management apparatus 50 via the network 40. Furthermore, the communication unit 61 receives device information and used amount from the communication unit 51 of the power management apparatus 50, and stores the device information and the used amount into the memory unit 66.

FIG. 6 shows one example of DR plan. In DR plan of FIG. 6, at each of four time slots from 11:00 to 15:00, a power consumption totally used by the group 20 is reduced by 200 (kWh). This DR plan is a calculation result by the first calculation unit 64 using device information of FIG. 5.

In this example, as to the device 1, an adjustment amount of 150 (kWh) is requested at two time slots 12:00-14:00 respectively. As to the device 2, adjustment amounts of 200, 50, 50, 100 (kWh) are requested at four time slots 11:00-15:00 respectively. As to the device 3, an adjustment amount of 100 (kWh) is requested at one time slot 14:00-15:00 respectively.

Figure 7:
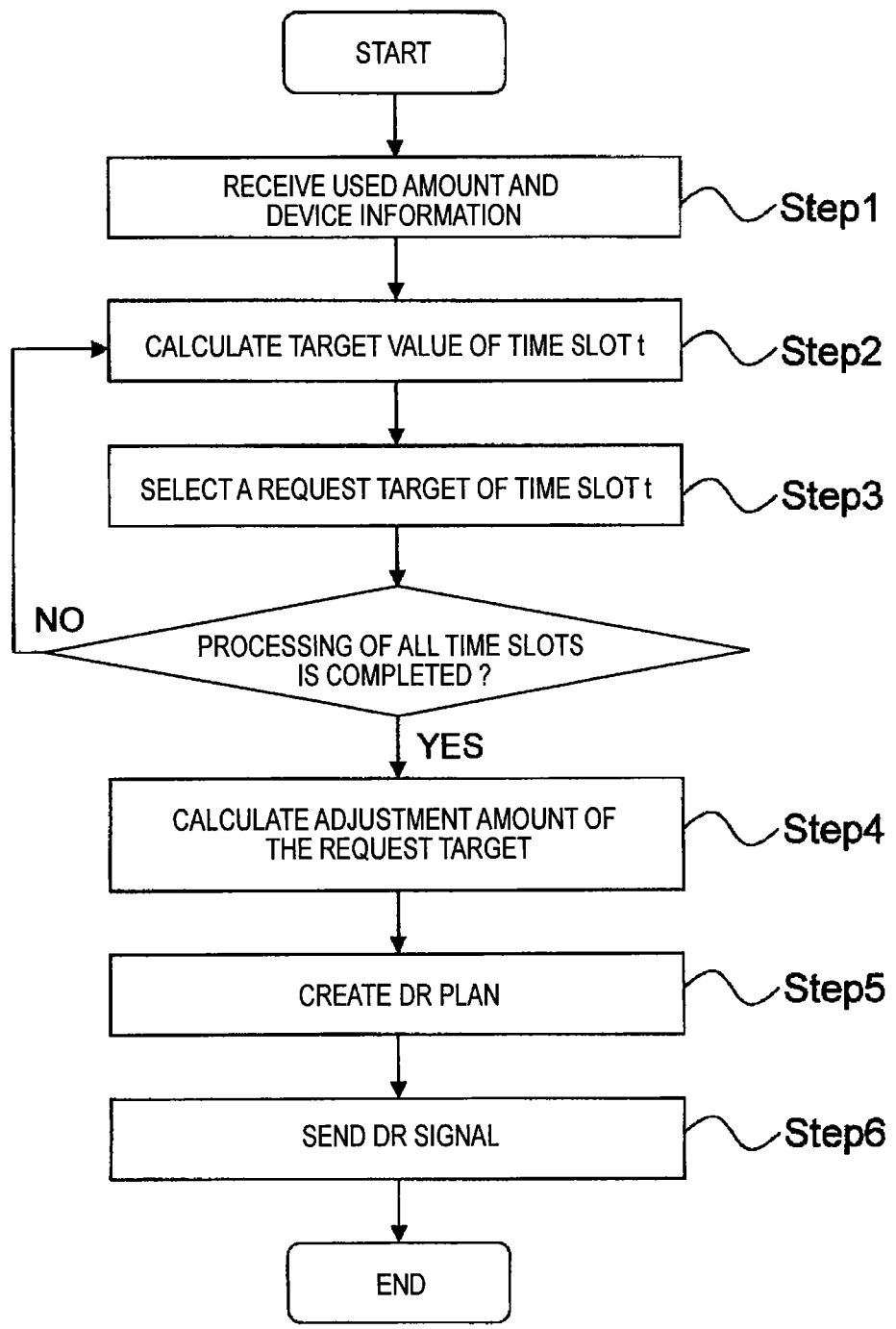
FIG. 7 is a flow chart of method for controlling power supply and demand according to the first embodiment.

FIG. 7 is a flow chart of processing to explain a method for controlling power supply and demand.

At step 1, the communication unit 61 receives a used amount and device information of each customer from the communication unit 51. Furthermore, the communication unit 61 stores the used amount and the device information into the memory unit 66.

At step 2, the target value calculation unit 62 calculates a target value at time slot t by using a supply plan and the used amount of each customer (obtained from the memory unit 66).

At step 3, the selection unit 63 selects a request target at time slot t from all devices 11 by using the device information (obtained from the memory unit 66).

Above-mentioned processing of step 2 and step 3 is performed for all time slots.

At step 4, the first calculation unit 64 solves the optimization problem of equations (1)~(5) by using the device information (obtained from the memory unit 66), and calculates an adjustment amount to the request target at each time slot.

At step 5, the plan creation unit 65 creates DR plan by using the adjustment amount (calculated by the first calculation unit 64). Furthermore, at step 6, the communication unit 61 sends DR signal based on the DR plan to the communication unit 51.

In above-mentioned explanation, the request target is an electric device able to control the power consumption. However, the request target may be an OA device, a water heater, a home electric device, an elevator, and a power device, may be used. Furthermore, a production line of factory having ability to execute the adjustment.

Furthermore, as the request target, for example, if the device is managed for each customer, one request target can be not one device but all devices of the customer. In this case, for example, one reserve capacity information is set to each customer.

Furthermore, in above explanation, an interval of time slot is one hour. However, the interval may be a longer unit such as morning/afternoon, i.e., two units in a day. Alternatively, the interval may be a smaller unit such as thirty minutes or fifteen minutes. Furthermore, the interval is not always constant.

Furthermore, the unit price per response may be different for the case of indicating the reduction amount as the adjustment amount, and the case of indicating the increase amount as the adjustment amount.

Furthermore, if the electric storage device 13 is included as the device 11, the power management apparatus 50 monitors a storage status (For example, residual quantity) of the electric storage device 13, and sends the storage status to the power supply and demand-control apparatus 60. In this case, if the selection unit 63 selects the electric storage device 13 as the request target, the selection unit 63 can refer to the residual quantity of the electric storage device 13 in addition to the minimum adjustment time thereof. Briefly, if the residual amount of the electric storage device 13 is larger than (or equal to) a specific percentage (For example, 50%), the electric storage device 13 is selected as a request target for power reduction (discharge). If the residual amount of the electric storage device 13 is smaller than the specific percentage (For example, 50%), the electric storage device 13 is selected as a request target for power increase (charge).

As to the apparatus and the method for controlling power supply and demand according to the first embodiment, the selection unit selects the request target to be requested for each time slot by using the minimum adjustment time. Accordingly, irrespective of a time to request power reduction, the customer's burden can be reduced.

(The First Modification)

Due to change of factors (For example, weather) affecting the power amount used by the customer, the demand-supply unbalance initially predicted may be largely changed. In this case, as to DR plan previously created (For example, 6:00), the demand-supply balance cannot be controlled with sufficient accuracy. Furthermore, when DR signal is once sent to all customers 10 at a time (For example, 7:00), they cannot cope with the case when the DR plan is changed after 7:00.

Accordingly, in the first modification, timing when the power supply and demand-control apparatus 60 creates DR plan, and timing when the power supply and demand-control apparatus 60 sends DR signal, are different from those of the first embodiment.

The communication unit 61 sends DR signal to each request target according to DR plan at a time t3. This time t3 is the minimum adjustment time earlier than a start time t2 of a time slot planned to request to each request target.

An example will be explained by referring to DR plan of FIG. 6. When device information of FIG. 5 is supplied, the communication unit 61 sends DR signal to the device (1,1) at time t3 (11:00) which is the minimum adjustment time (one hour) earlier than time t2 (12:00). In the same way, the communication unit 61 sends DR signal to the device (1,2) and the device (2,1) at 8:00.

If the power demand is predicted to be largely changed, the target value calculation unit 62 calculates a target value automatically or at timing indicated by an operator. As the factor that the power demand is largely changed, for example, change of weather is considered.

Here, when the target value calculation unit 62 newly calculates a target value at a time slot (time t2) planned to request to each request target, based on a target value (first target value) at time t2 calculated by the target value calculation unit 62 previously (before time t2), the first calculation unit 64 calculates an adjustment amount at time t2. Here, the case that the communication unit 61 already sent the adjustment amount to a part of target requests will be thought about.

In this case, the target value calculation unit 62 subtracts a sum of adjustment amount at time t2 (already sent by the communication unit 61) from absolute value of the demand-supply unbalance, and sets the result value to a new target value (second target value) at time t2.

For example, at timing when the target value calculation unit 62 calculates the second target value, the first calculation unit 64 solves the optimization problem of equations (1)~(5) by using device information and the second target value. In this way, the first calculation unit 64 calculates an adjustment amount to each request target. Moreover, in this case, as a target value $E_t$ of the equation (3), the second target value is used.

The plan creation unit 65 creates DR plan for a request target by using the adjustment amount to the request target (calculated by the first calculation unit 64). The plan creation unit 65 stores the DR plan into the memory unit 66.

As a result, by using DR plan obtained from the latest target value, the power supply and demand-control apparatus 60 can control the supply and demand balance with high-accuracy. Furthermore, the customer's burden can be reduced since DR signal is sent considering the minimum adjustment time.

(The Second Modification)

Due to change of factors (For example, weather) affecting the power amount used by the customer, the demand-supply unbalance initially predicted may be largely changed. When DR signal is once sent at a time (For example, 6:00), they cannot cope with the case when the demand-supply unbalance is changed after 6:00.

Accordingly, in the second modification, by considering the case that the power demand has statistic fluctuation, DR plan is created. Here, the power demand x at time slot t is fluctuated by a density function f(x), and the target value is also fluctuated by a density function f(y). Briefly, the density function f(y) is a probability density function of which random variable is a target value y (kWh) at time slot t. In other words, the density function f(y) is a function representing probability to occur excess or shortage of power y (kWh) at time slot t.

For example, by using an estimation value of the power demand at a time slot and an actual value of the power demand at the same time slot in the past, a density function f(y) of which random variable is a target value y (kWh) at each time slot to be targeted DR plan.

In this case, a function form of the density function f(y), i.e., distribution, can be from relationship between estimation value and actual value of the power demand in the past. Alternatively, distribution experimentally known can be used. Furthermore, parameters included in the distribution can be estimated by conventional method (For example, maximum likelihood estimation).

Figure 8:
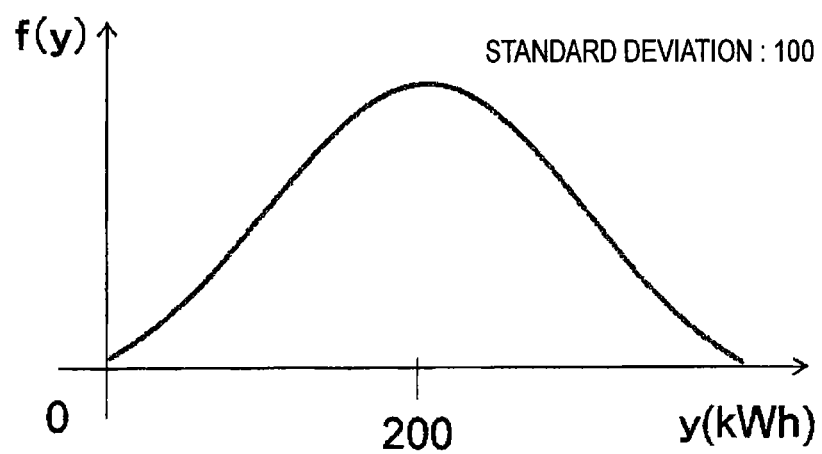
FIG. 8 is one example of target value according to a second modification of the first embodiment.

FIG. 8 shows an example of the target value as a density function f(y) of normal distribution having parameters (average: 200 (kWh), standard deviation: 100).

For example, by solving following optimization problem using device information and the density function f(y) (calculated by the target value calculation unit 62), the first calculation unit 64 calculates an adjustment amount to each request target.

$$\min \sum_{t \in T} \left\{ \left( \sum_{k \in K} C^k \cdot v_t^k \int_{w_t^{k}-1}^{\infty} f(y) dy \right) + P \cdot \int_{w_t^{|k|}}^{\infty} f(y) dy \right\} \quad (6)$$

$$\text{s.t.} \quad 0 \leq v_t^k \leq A^k \cdot x_t^k \quad \forall k \in K, \quad \forall t \in T \quad (7)$$

$$\sum_{t \in T} L_t \cdot x_t^k \leq M^k \quad \forall k \in K \quad (8)$$

-continued $$\sum_{t \in T} v_t^k \leq N^k \quad \forall k \in K \tag{9}$$

$$w_t^0 = 0 \quad \forall t \in T \tag{10}$$

$$w_t^k = \sum_{j=1}^{k} v_t^j \quad \forall k \in K, \quad \forall t \in T \tag{11}$$

Here, in equations (6)~(11), parameters are defined as follows.

$x_t^k$: variable representing request or non-request for request target k at time slot t (In case of request, $x_t^k=1$. In case of non-request, $x_t^k=0$).

$v_t^k$: adjustment amount to request target k at time slot t (In case of $E_t > 0$, reduction amount. In case of $E_t < 0$, increase amount)

$w_t^k$: sum of adjustment amount to request target 1~k at time slot t

K={1, 2, ..., |K|}: set of request target
T={1, 2, ..., |T|}: set of time slot
$L_t$: interval at time slot t
$A^k$: maximum adjustment amount of request target k (In case of $E_t > 0$, maximum of reduction amount. In case of $E_t < 0$, maximum of increase amount)
$C^k$: unit price per response of request target k
$M^k$: total time of request target k
$N^k$: total adjustment amount of request target k Here, a device ID (=k) is assigned to each request target in descending order of the minimum adjustment time thereof. If the minimum adjustment times of request targets are equal, the k-th device ID is assigned in ascending order of unit price per response thereof. The request target of the k-th device ID is called k-th request target. Furthermore, as timing to send DR signal, by considering the minimum adjustment time of each request target, the latest timing able to cope with adjustment is selected.

In above equations, the equation (6) is an objective function representing an expected value of cost. The cost includes a cost assigned to the customer 10 by adjusting the power consumption of the device 11, and a cost in case that a sum of adjustment amount is smaller than the target value.

Here, since $w_t^k$ represents a sum of adjustment amount to request targets 1~k at time slot t, k-th request target is used when the target value y is larger than or equal to $w_t^{k-1}$.

Here, a unit price per response of k-th request target is $C^k$. Accordingly, when k-th request target is used, following equation in the equation (6) represents an expected value of cost assigned to the customer 10.

$$C^k v_t^k \int_{w_t^{k-1}}^{\infty} f(x)dx \tag{12}$$

On the other hand, if the target value y at time slot t is larger than $w_t^{|k|}$, even if all request targets are used, the sum of adjustment amount is smaller than the target value. A following equation is obtained by multiplying excess or shortage amount with penalty P. This equation represents an expected value of cost when excess and shortage of adjustment amount occurs.

$$P \int_{w_t^{|k|}}^{\infty} f(x)dx \tag{13}$$

An expected value of cost at time slot t is a sum of the expected value of cost by the equation (12) and the expected value of cost by the equation (13). Accordingly, as shown in the equation (6), the objective function is represented as a sum of expected values of cost over all time slots t.

By solving optimization problem of equations (6)~(11), the first calculation unit 64 calculates an adjustment amount to each request target at each time slot so that a sum of adjustment amount to each request target gets closer to the target value and so that the expected value of cost is minimized. Moreover, the optimization problem of equations (6)~(11) can be solved by using stochastic programming or approximate method such as sample-path optimization.

As a result, by using DR plan into which statistic fluctuation of the target value is considered, the power supply and demand-control apparatus 60 can control the demand-supply unbalance with high-accuracy.

The Second Embodiment

Figure 9:
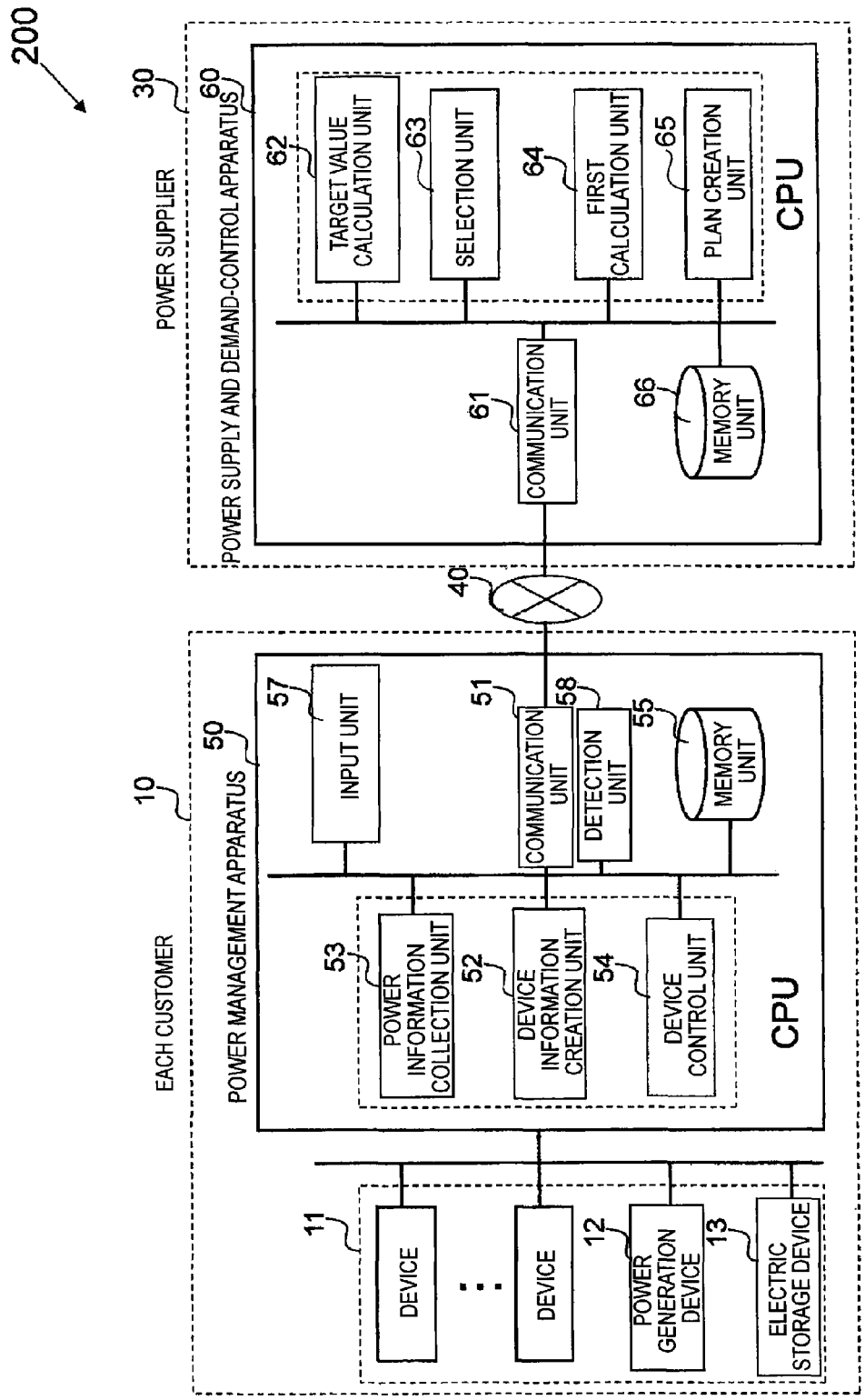
FIG. 9 is a block diagram of the power control system according to the second embodiment.

FIG. 9 is a block diagram of a power control system 200 according to the second embodiment. In the power control apparatus 50 of FIG. 9, the device information creation unit 52 creates device information including reserve capacity information shown in FIG. 10.

Reserve capacity includes "maximum adjustment amount" adjustable for each time slot in case of using the device 11. Briefly, the maximum adjustment amount can be differently set to each time slot at which power consumption is adjusted by the device 11.

Furthermore, the reserve capacity information includes "unit price per response" for each time slot, in case of adjusting (regulating) the power consumption of the device 11 by unit amount (e.g. 1 kWh). Briefly, the unit price per response can be differently set to each time slot at which power consumption is adjusted by the device 11.

In the power supply and demand-control apparatus 60, for example, by solving an optimization problem (following equation) using device information, the first calculation unit 64 calculates an adjustment amount to each request target at each time slot.

$$\min \Sigma_{t \in T} \Sigma_{k \in K} \{v_t^k \cdot C_t^k\} \tag{14}$$

$$s.t. \Sigma_{k \in K} v_t^k - |E_t| \geq 0 \forall t \in T \tag{15}$$

$$0 \leq v_t^k \leq A_t^k \cdot x_t^k \forall k \in K, \forall t \in T \tag{16}$$

$$\Sigma_{t \in T} L_t \cdot x_t^k \leq M_k \forall k \in K \tag{17}$$

$$\Sigma_{t \in T} v_t^k \leq N^k \forall k \in K \tag{18}$$

Here, in equations (14)~(18), parameters are defined as follows.

$x_t^k$: variable representing request or non-request for request target k at time slot t (In case of request, $x_t^k=1$. In case of non-request, $x_t^k=0$)

$v_t^k$: adjustment amount to request target k at time slot t (In case of $E_t > 0$, reduction amount. In case of $E_t < 0$, increase amount)

K={1, 2, ..., |K|}: set of request target
T={1, 2, ..., |T|}: set of time slot
$|E_t|$: target value at time slot t
$E_t$: demand-supply unbalance at time slot t (In case of demand-excess, $E_t > 0$. In case of supply-excess, $E_t < 0$)
$L_t$: interval at time slot t
$A_t^k$: maximum adjustment amount of request target k at time slot t (In case of $E_t > 0$, maximum of reduction amount. In case of $E_t < 0$, maximum of increase amount)
$C_t^k$: unit price per response of request target k at time slot t
$M^k$: total time of request target k
$N^k$: total adjustment amount of request target k In the reserve capacity information included in the device information, as shown in FIG. 10, "maximum adjustment amount" and "unit price per response" may have multiple level values for each time slot. Furthermore, as shown in FIG. 11, they may have multiple level values based on an interval between a time slot to be targeted the request and a timing for the power management apparatus 50 to receive DR signal. In this case, as to "unit price per response" especially, the shorter the interval is, the larger the multiple values are.

As a result, the first calculation unit 64 can calculate the adjustment amount so that unpleasantness degree of each customer 10 is minimized. Here, the unpleasantness degree is due to an interval between a timing for each customer 10 to accept a request to adjust the power consumption and a timing for the customer to execute the request. As to the unpleasantness degree, the longer the interval is, the larger the value is. Conversely, the shorter the interval is, the smaller the value is. Briefly, the pleasantness degree is an index representing unpleasantness felt by the customer while adjusting the power consumption of the device 11.

Furthermore, if the device 11 (For example, an air conditioner) has a plurality of operation conditions (such as a preset temperature) changeable, as shown in reserve capacity information of FIG. 12, "maximum adjustment amount" and "unit price per response" may have multiple values for each operation condition. In this case, a plurality of tables may be set in accordance with external environment such as the air temperature.

As to the apparatus and the method for controlling power supply and demand according to the second embodiment, the customer's burden is evaluated as the unpleasantness degree due to an interval between two timings for the customer to accept a request and to execute the request. Accordingly, this unpleasantness degree can be reduced.

The Third Embodiment

Figure 13:
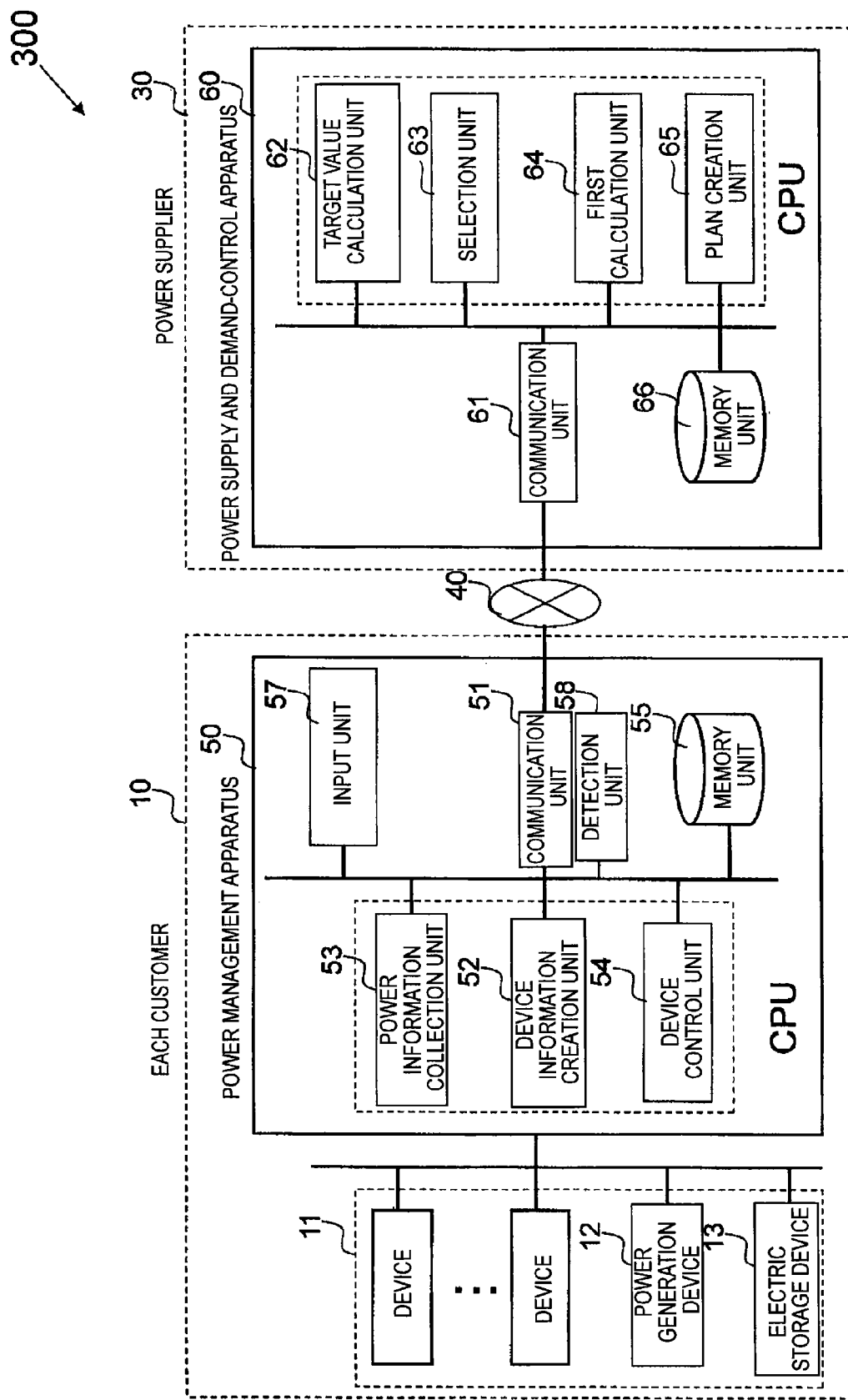
FIG. 13 is a block diagram of the power control system according to the third embodiment.

FIG. 13 is a block diagram of a power control system 300 according to the third embodiment. In the power management apparatus 50 of FIG. 13, the device information creation unit 52 creates device information including reserve capacity information shown in FIG. 14.

Briefly, in the third embodiment, an adjustment amount is a positive value in case of a reduction amount. Conversely, in case of an increase amount, the adjustment amount is a negative value.

In this case, a maximum adjustment amount of the reserve capacity information includes a maximum and a minimum of the adjustment amount, i.e., a maximum reduction amount (positive value) in case of requesting the reduction amount, and a maximum increase amount (negative value) in case of requesting the increase amount. Furthermore, a total adjustment amount means an upper limit of adjustment amount (absolute value) adjustable in one day. Briefly, this total adjustment amount limits a sum of an absolute value of the reduction amount and an absolute value of the increase amount, when both the reduction amount and the increase amount are requested as the adjustment amount in one day.

The target value calculation unit 62 calculates a power amount equal to demand-supply unbalance as a target value.

For example, by solving an optimization problem (following equation) of which decision variables are adjustment amount of power consumption to each request target, the first calculation unit 64 calculates the adjustment amount to each request target at each time slot.

$$\min \Sigma_{y \in T} \Sigma_{k \in K} \{|v_t^k| \cdot C^k\} \quad (19)$$

$$s.t. S_t(\Sigma_{k \in K} v_t^k - E_t) \geq 0 \forall t \in T \quad (20)$$

$$B^k \cdot x_t^k \leq v_t^k \leq A^k \cdot x_t^k \forall k \in K, \forall t \in T \quad (21)$$

$$\Sigma_{t \in T} L_t \cdot x_t^k \leq M_k \forall k \in K \quad (22)$$

$$\Sigma_{t \in T} v_t^k \leq N^k \forall k \in K \quad (23)$$

Here, in equations (19)~(23), parameters are defined as follows.

$x_t^k$: variable representing request or non-request for request target k at time slot t (In case of request, $x_t^k=1$. In case of non-request, $x_t^k=0$)

$v_t^k$: adjustment amount to request target k at time slot t $K=\{1, 2, \ldots, |K|\}$: set of request target $T=\{1, 2, \ldots, |T|\}$: set of time slot $E_t$: target value at time slot t $L_t$: interval at time slot t $A^k$: maximum adjustment amount of request target k (reduction amount)

$B^k$: maximum adjustment amount of request target k (increase amount)

$C^k$: unit price per response of request target k $M^k$: total time of request target k $N^k$: total adjustment amount of request target k $S_t$: auxiliary variable (In case of $E_t > 0$, the value is 1. In case of $E_t < 0$, the value is −1)

As to the apparatus and the method for controlling power supply and demand according to the third embodiment, at the same time slot, increase of power is requested to a part of devices (or customers), and reduction of power is requested to another part of devices (or customers). As a result, free degree of request can be increased.

The Fourth Embodiment

Figure 15:
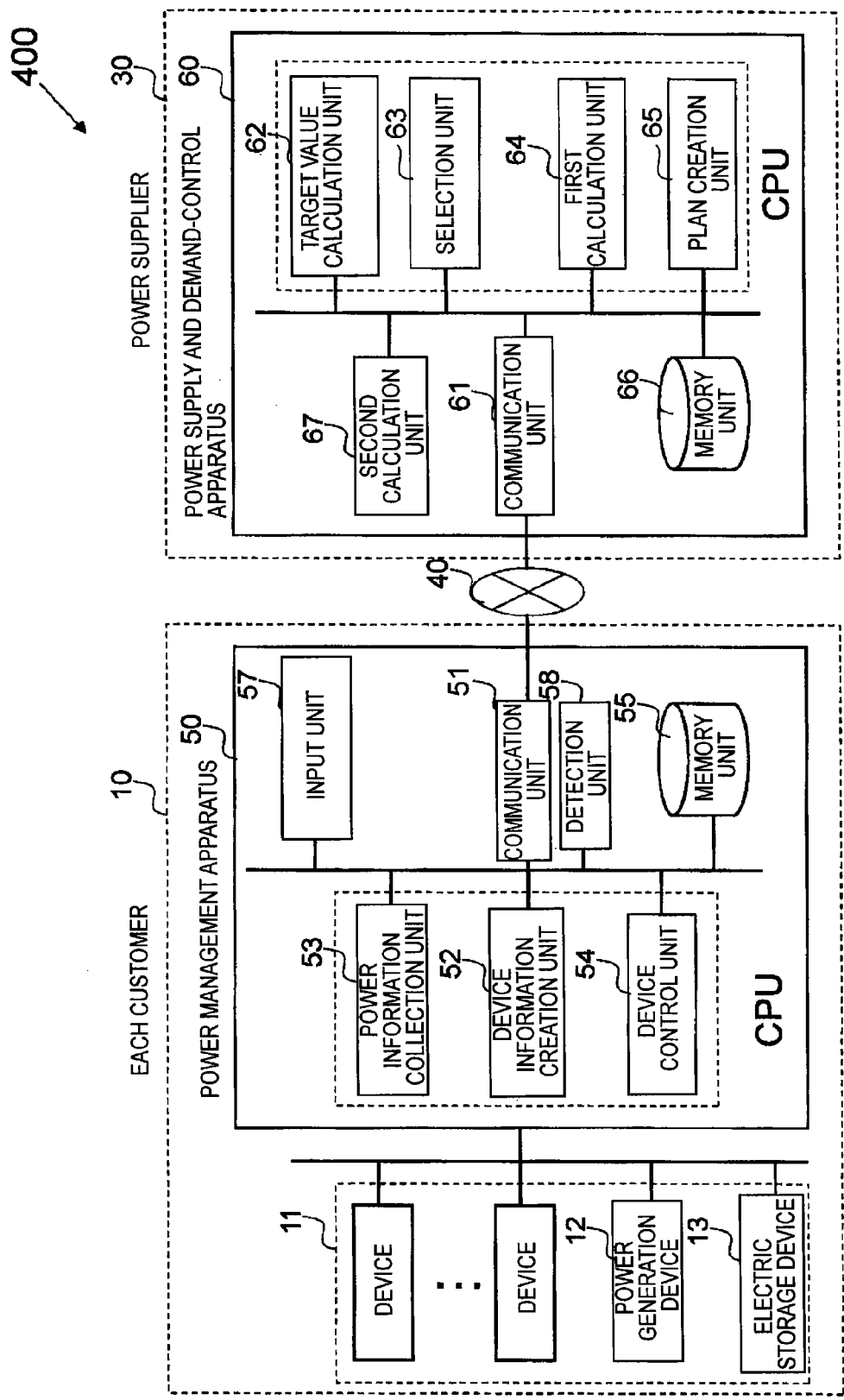
FIG. 15 is a block diagram of the power control system according to the fourth embodiment.

FIG. 15 is a block diagram of a power control system 400 according to the fourth embodiment. In the power supply and demand-control apparatus 60 of FIG. 15, a second calculation unit 67 is further included. Furthermore, the power management apparatus 50 includes a display unit 56.

By using DR plan and device information, the second calculation unit 67 calculates an incentive of each customer 10. Specifically, by multiplying an adjustment amount to a request target k at time slot t (shown in DR plan) by a unit price per response of the request target k at time slot t (shown in device information), the incentive of the request target k at time slot t is calculated. Then, by summing incentives of all request targets k equipped by each customer 10 at all time slots, the incentive of each customer 10 is calculated.

The communication unit 61 obtains the incentive calculated by the second calculation unit 67, and sends the incentive to the communication unit 51 of the power management apparatus 50 via the network 40.

The display unit 56 obtains the incentive form the communication unit 51, and outputs the incentive via, for example, a display and so on.

As to the apparatus and the method for controlling power supply and demand according to at least one of above-mentioned embodiments, irrespective of time to request reduction of power, the customer's burden can be reduced.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for sending a request to adjust a power consumption to a plurality of request targets, based on power supply and demand, comprising:
a memory unit configured to store a minimum adjustment time of each request target, the minimum adjustment time being an interval between a time when a request target receives the request and a time when the request target starts to adjust the power consumption;
a selection unit configured to, if an estimation value of the power supply is different from an estimation value of the power demand at a first time to start to adjust the power consumption, select at least one request target from the request targets by using the minimum adjustment time, the at least one request target being acceptable for the request at a second time, the second time being a predetermined time prior to the first time; and
a first calculation unit configured to calculate a first adjustment amount to the at least one request target until the second time.

2. The apparatus according to claim 1, wherein
the selection unit selects the at least one request target of which the minimum adjustment time is shorter than or equal to an interval between the first time and the second time.

3. The apparatus according to claim 1, wherein
the second time is the minimum adjustment time prior to the first time,
further comprising:
a communication unit configured to send a signal indicating the first adjustment amount to the at least one request target at the second time.

4. The apparatus according to claim 1, wherein
the first calculation unit calculates the first adjustment amount so that the sum of adjustment amounts to the plurality of request targets gets close to a target value, and
the target value is a power amount to resolve a gap value between the estimation value of the power supply and the estimation value of the power demand.

5. The apparatus according to claim 4, wherein
the first calculation unit calculates a cost to execute the first adjustment amount, and calculates the first adjustment amount so that the cost is minimized.

6. The apparatus according to claim 4, wherein
the first calculation unit calculates a cost to execute the first adjustment amount if the at least one request target receives the request, and calculates the first adjustment amount so that the cost is minimized.

7. The apparatus according to claim 5, further comprising:
a second calculation unit configured to calculate an incentive of the at least one request target by using the cost.

8. The apparatus according to claim 4, wherein
the first calculation unit calculates a probability density function of which variable is a gap value between the power supply and the power demand, and calculates the first adjustment amount by using the probability density function.

9. The apparatus according to claim 1, wherein
the request target is one device equipped by a customer to accept the power supply.

10. The apparatus according to claim 1, wherein
the request target is a plurality of devices equipped by a customer to accept the power supply, and
the memory unit stores the minimum adjustment time as an interval between a time when the customer receives the request and a time when the customer starts to adjust the power consumption.

11. A method for controlling an apparatus that sends a request to adjust a power consumption to a plurality of request targets, based on power supply and demand, the method comprising:
receiving a minimum adjustment time of each request target, the minimum adjustment time being an interval between a time when a request target receives the request and a time when the request target starts to adjust the power consumption;
if an estimation value of the power supply is different from an estimation value of the power demand at a first time to start to adjust the power consumption,
selecting at least one request target from the request targets by using the minimum adjustment time, the at least one request target being acceptable for the request at a second time, the second time being a predetermined time prior to from the first time; and
calculating a first adjustment amount to the at least one request target until the second time.

12. The method according to claim 11, wherein
the selecting includes
selecting the at least one request target of which the minimum adjustment time is shorter than or equal to an interval between the first time and the second time.

13. The method according to claim 11, wherein
the second time is the minimum adjustment time prior to the first time,
further comprising:
sending a signal indicating the first adjustment amount to the at least one request target at the second time.

14. The method according to claim 11, wherein
the calculating includes
calculating the first adjustment amount so that the sum of adjustment amounts to the plurality of request targets gets close to a target value,
wherein the target value is a power amount to resolve a gap value between the estimation value of the power supply and the estimation value of the power demand.

* * * * *